(12) United States Patent
Kuffel et al.

(10) Patent No.: US 10,948,663 B2
(45) Date of Patent: Mar. 16, 2021

(54) SMALL FORM FACTOR MULTI-FIBER CONNECTOR

(71) Applicant: Panduit Corp., Tinley Park, IL (US)

(72) Inventors: Gregory L. Kuffel, Plainfield, IL (US); Benjamin J. Berridge, Highland, IN (US); Jerry A. Wiltjer, Frankfort, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 16/429,601

(22) Filed: Jun. 3, 2019

(65) Prior Publication Data

US 2020/0064562 A1    Feb. 27, 2020

Related U.S. Application Data

(60) Provisional application No. 62/680,642, filed on Jun. 5, 2018.

(51) Int. Cl.
    *G02B 6/38*    (2006.01)

(52) U.S. Cl.
    CPC ......... *G02B 6/3882* (2013.01); *G02B 6/3825* (2013.01); *G02B 6/3831* (2013.01); *G02B 6/3877* (2013.01)

(58) Field of Classification Search
    CPC .. G02B 6/3882; G02B 6/3825; G02B 6/3831; G02B 6/3877; G02B 6/3885
    See application file for complete search history.

(56) References Cited

U.S. PATENT DOCUMENTS

| | | | |
|---|---|---|---|
| 4,896,938 A | 1/1990 | Mathis et al. | |
| 5,239,603 A | 8/1993 | Sonoda et al. | |
| 5,408,557 A | 4/1995 | Hsu | |
| 5,577,644 A | 11/1996 | Chen | |
| 5,838,856 A * | 11/1998 | Lee | G02B 6/3821 |
| | | | 385/54 |
| 6,135,644 A | 10/2000 | Hakogi et al. | |
| 6,168,317 B1 | 1/2001 | Shahid | |
| 6,227,721 B1 | 5/2001 | Naito et al. | |
| 6,283,644 B1 | 9/2001 | Gilliland et al. | |
| 7,186,035 B2 | 3/2007 | Dunn et al. | |
| 9,935,808 B2 | 4/2018 | Park et al. | |
| 2004/0042731 A1 | 3/2004 | Hall | |

FOREIGN PATENT DOCUMENTS

| WO | 2006036685 A2 | 4/2006 |
|---|---|---|
| WO | 2016053853 A1 | 4/2016 |

* cited by examiner

*Primary Examiner* — John Bedtelyon
(74) *Attorney, Agent, or Firm* — Christopher S. Clancy; James H. Williams; Christopher K. Marlow

(57) ABSTRACT

A fiber optic connector has a housing and a ferrule contained within the housing. The ferrule has a base portion, an endface portion protruding from the base, and at least one alignment tower extending from the base portion parallel to the endface portion. In one embodiment, the ferrule can have one alignment tower on each side of the endface portion. In one embodiment. The alignment towers extend the same distance from the base portion as the endface portion. In another embodiment, the alignment towers may be connected to the endface portion via webbing.

6 Claims, 26 Drawing Sheets

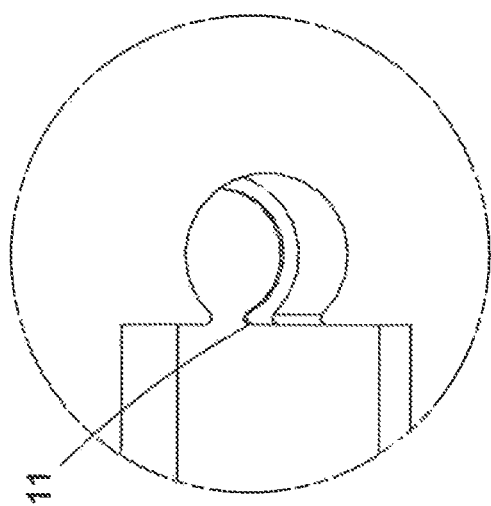
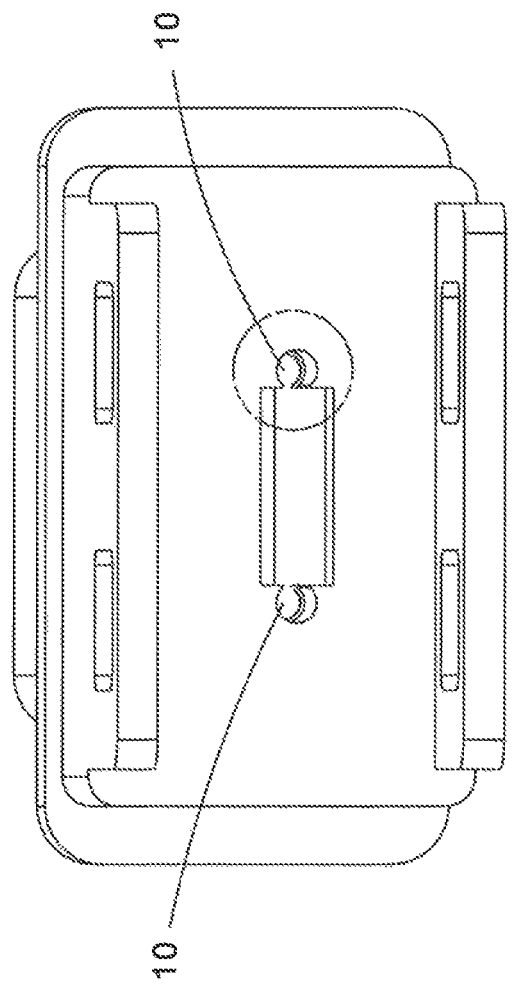
Fig. 8

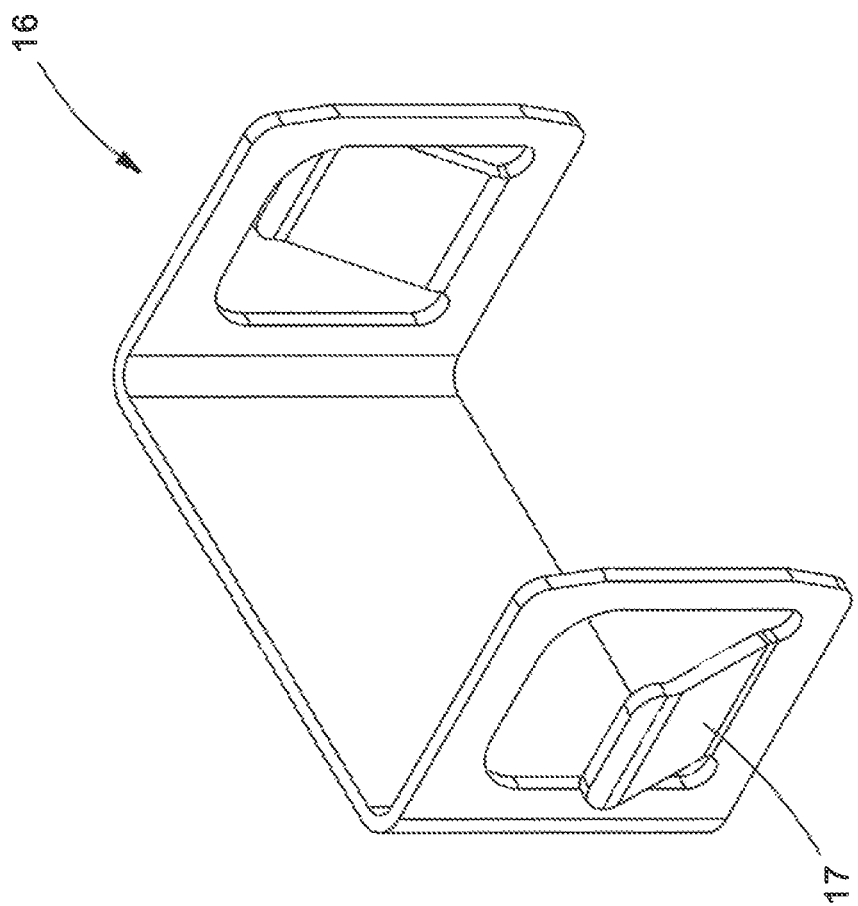

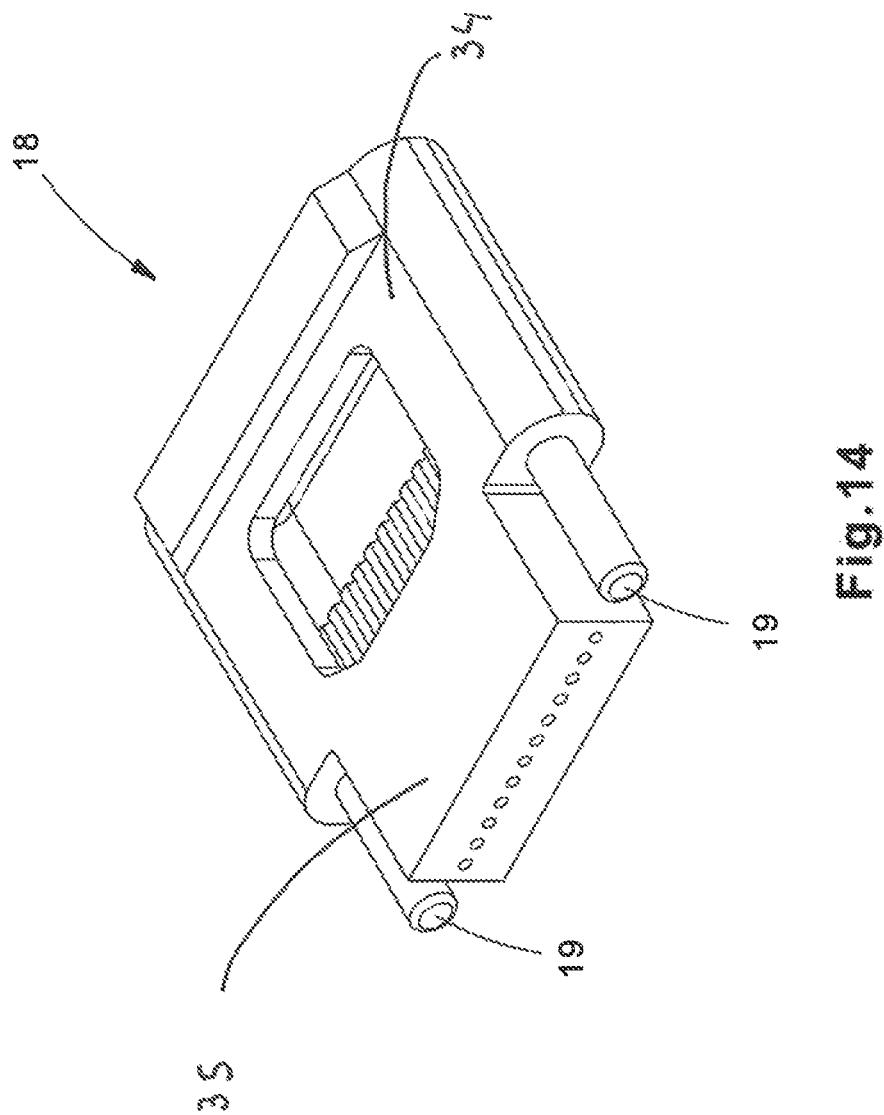

SMALL FORM FACTOR MULTI-FIBER CONNECTOR

CROSS REFERENCE TO RELATED APPLICATIONS

This application claims priority to U.S. Provisional Application No. 62/680,642, filed Jun. 5, 2018, the subject matter of which is hereby incorporated by reference in its entirety.

FIELD OF THE INVENTION

The present invention is related to fiber optic connectors and more specifically to small form factor multi-fiber connectors.

BACKGROUND

The Next Generation Data Center Connector (NGDC) is a 12 fiber MPO connector with a small form factor. The design allows for a connector with 12 fibers to fit into an adapter which fits into approximately the same size opening as a simplex LC adapter. As shown in FIG. 1, with this design, 144 NGDC adapters 1 can fit into a IRU patch panel 2, providing 1728 fibers per RU.

FIGS. 2-5 show the NGDC adapter and connector. Pins 3 held in each Male NGDC adapter 4 align the connectors inside the Male NGDC adapter when interacting with holes 5 located in the Female NGDC ferrule 6. With this design, the female features are located on the NGDC ferrule and the male features are located inside the NGDC adapter. The pins are held in the Male adapter using a metal bracket 7 and supported by circular molded features 8. The metal bracket does not offer much support to the pins, leaving the pins and bracket susceptible to bending during connector insertion and pin cleaning with swabs, possibly causing misalignment and or damage to the connector's ferrule alignment holes.

BRIEF DESCRIPTION OF THE FIGURES

FIG. 8 is a rear view of the front FSSA half highlighting the cylindrical holes used to hold the split sleeves.

FIG. 12 is an isometric view of a metal clip to be used with the FSSA.

FIG. 14 is a front isometric view of a Male NGDC Ferrule (MNF).

DETAILED DESCRIPTION OF THE DRAWINGS

The new design described in this application offers more support for the connectors, and, eliminates the possibility of pin or support bracket damage and misalignment by using split sleeves or similar devices in the adapter to align male features on the multi-fiber ferrule. For the following design, the female features would be located in the NGDC adapter and the male features would be located on the NGDC ferrule. Currently, LC and SC connectors utilize similar designs.

Figure 1:
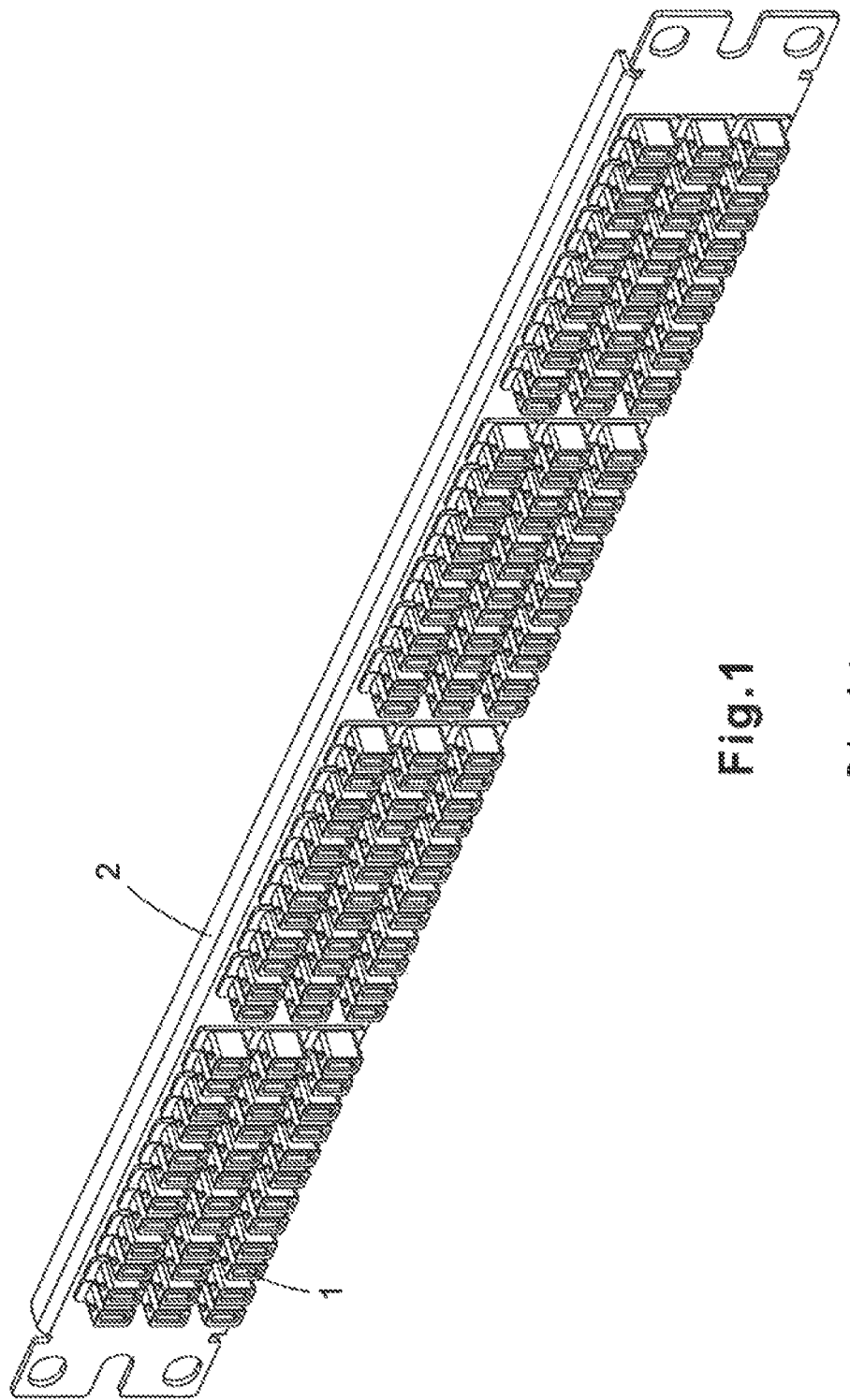
FIG. 1 is an isometric view of a 1 RU patch panel using Next Generation Data Center (NGDC) adapters.
Figure 2:
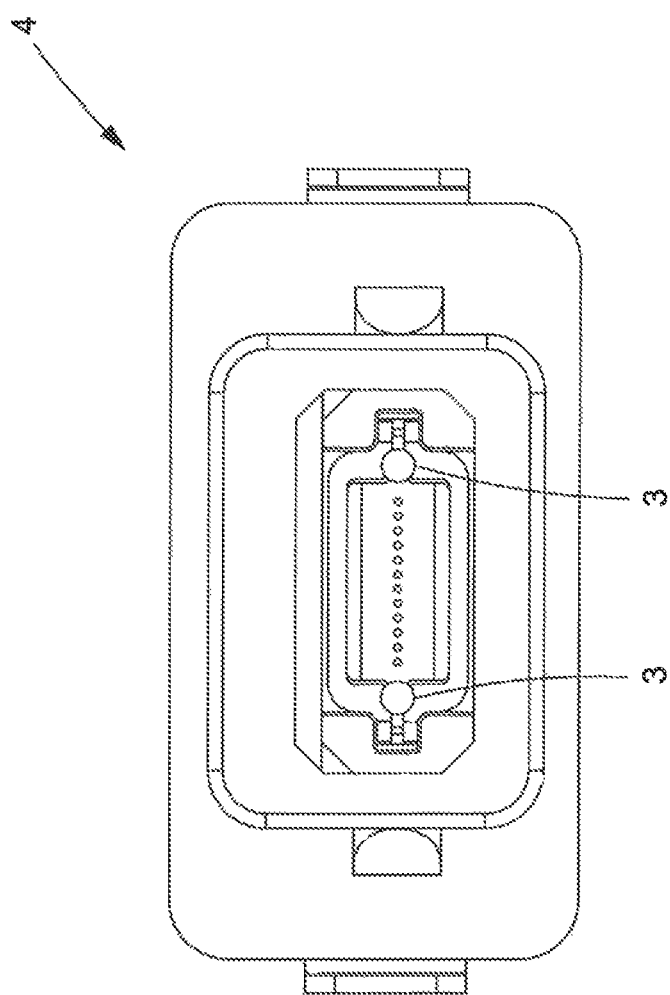
FIG. 2 is a front view of an NGDC adapter.
Figure 3:
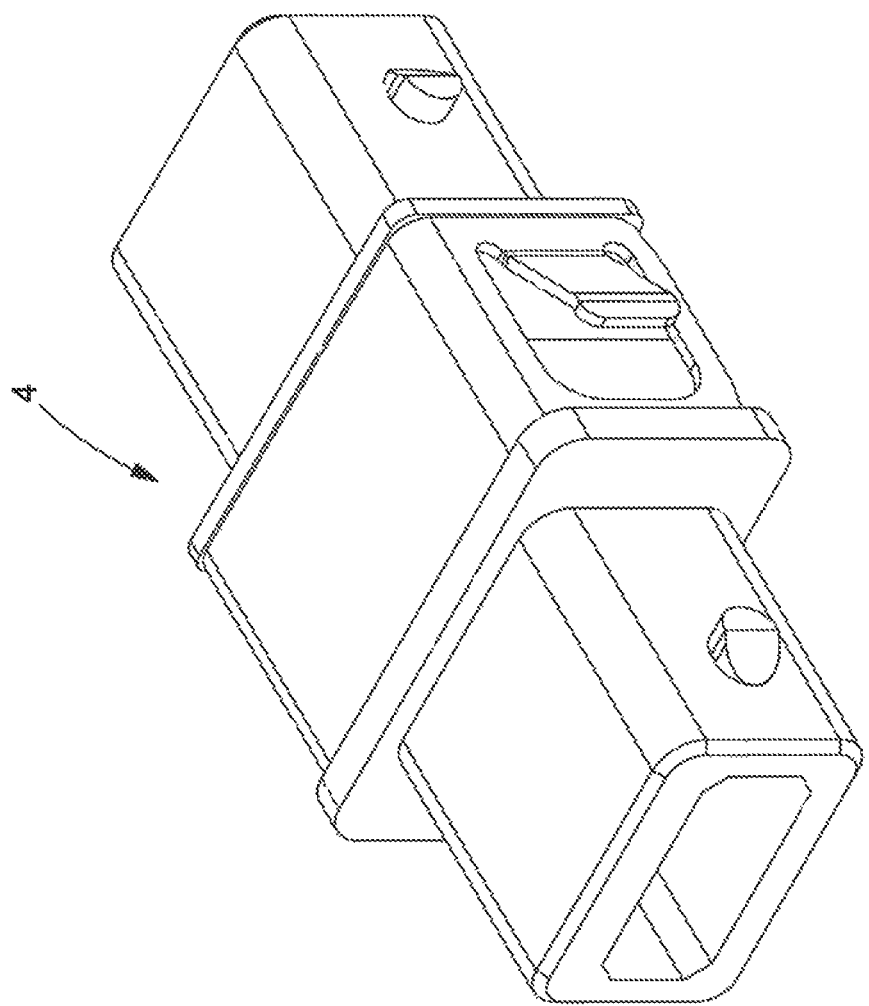
FIG. 3 is an isometric view of the NGDC adapter of FIG. 2.
Figure 4:
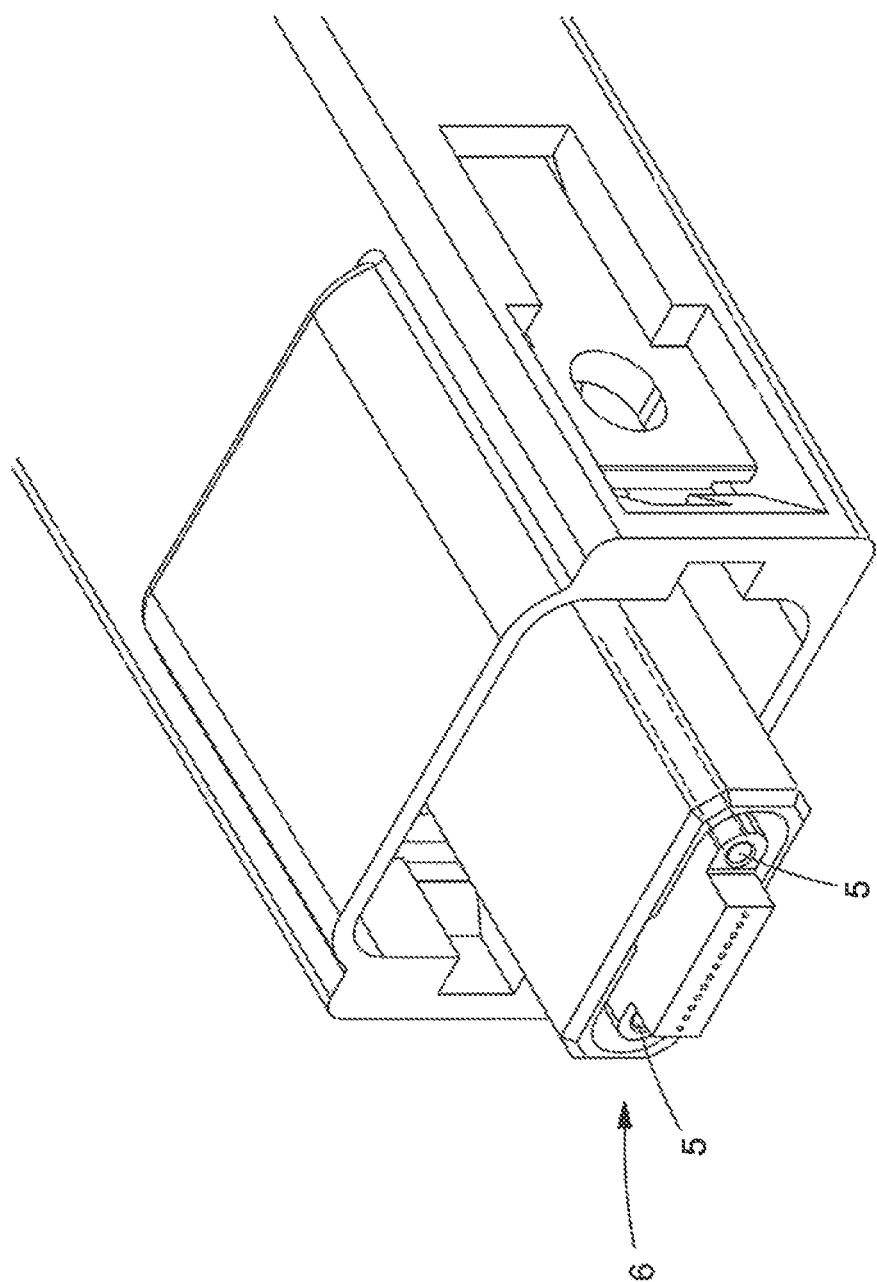
FIG. 4 is an isometric view of an NGDC connector.
Figure 5:
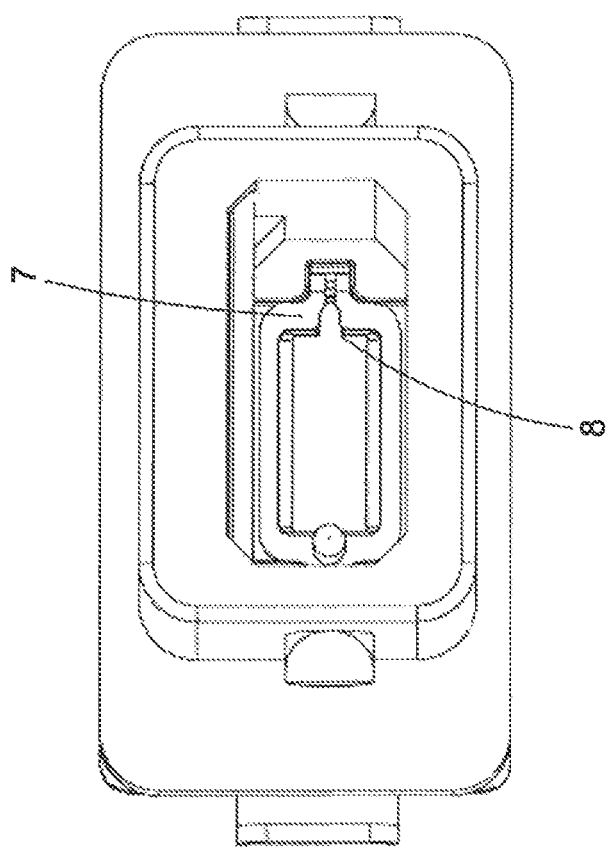
FIG. 5 is a front view of the NGDC adapter of FIG. 2 with one of the pins removed to show the features used to hold the pins in the adapter.
Figure 6:
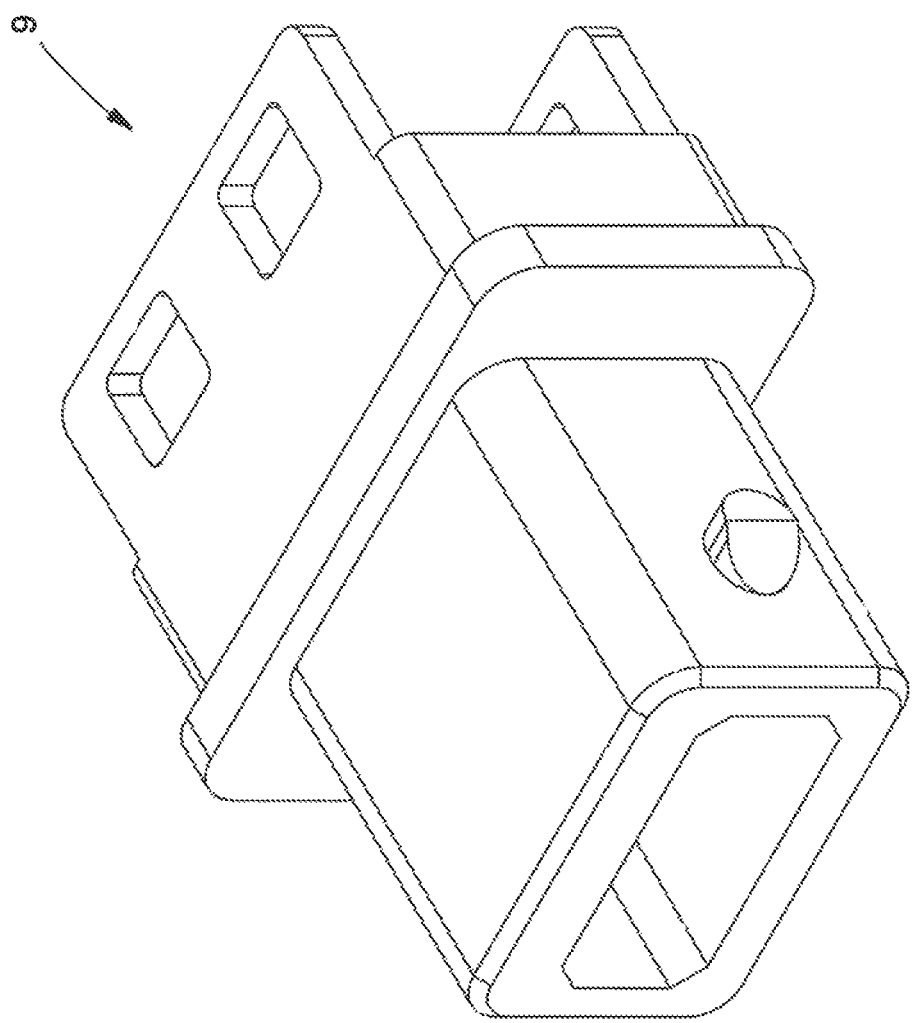
FIG. 6 is a front isometric view of a front half of a Female Split Sleeve Adapter (FSSA).
Figure 7:
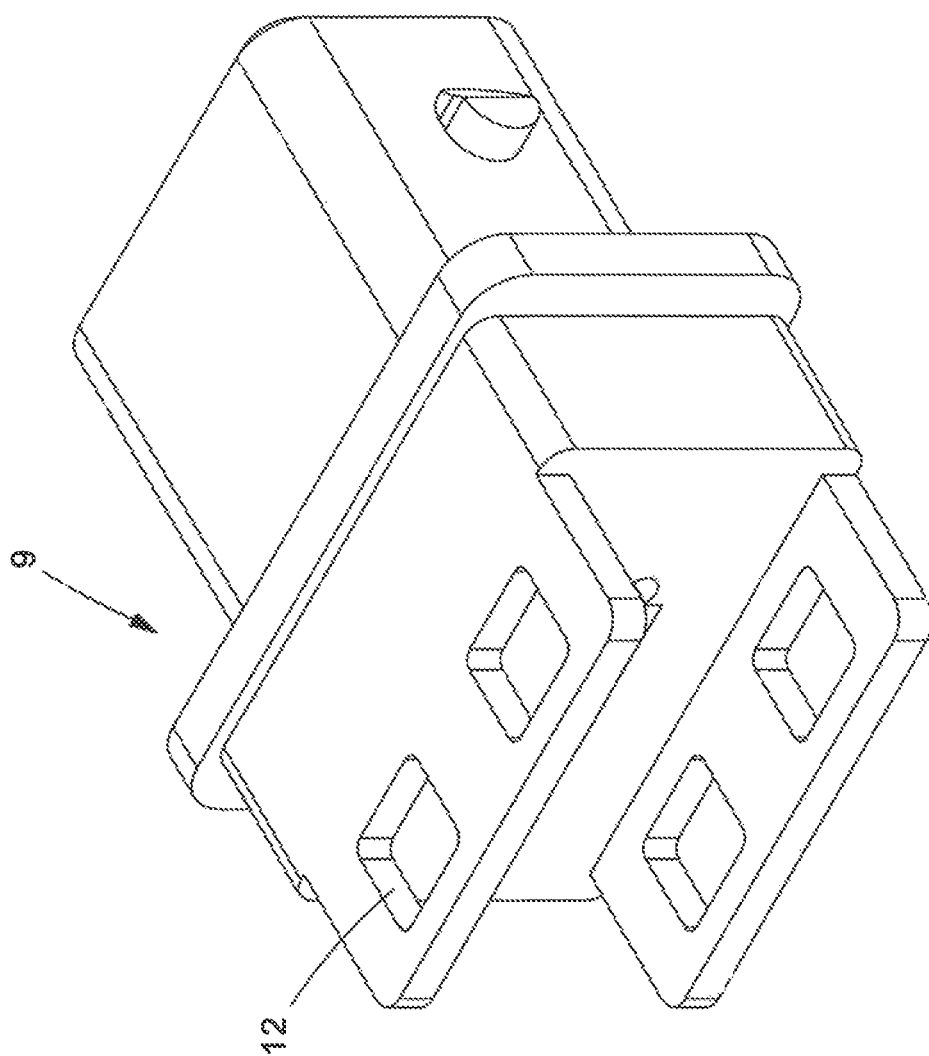
FIG. 7 is a rear isometric view of the front FSSA half of FIG. 6.

The first part included in the FSSA is the front adapter half 9 shown in FIGS. 6, 7, and 8. Cylindrical holes 10 will be used to hold 2 separate split sleeves 15 (see FIG. 11). A plastic lip 11 will be used to keep the split sleeve from falling out of the adapter. Windows 12 will be used to attach the rear adapter half of the FSSA to the front half.

Figure 9:
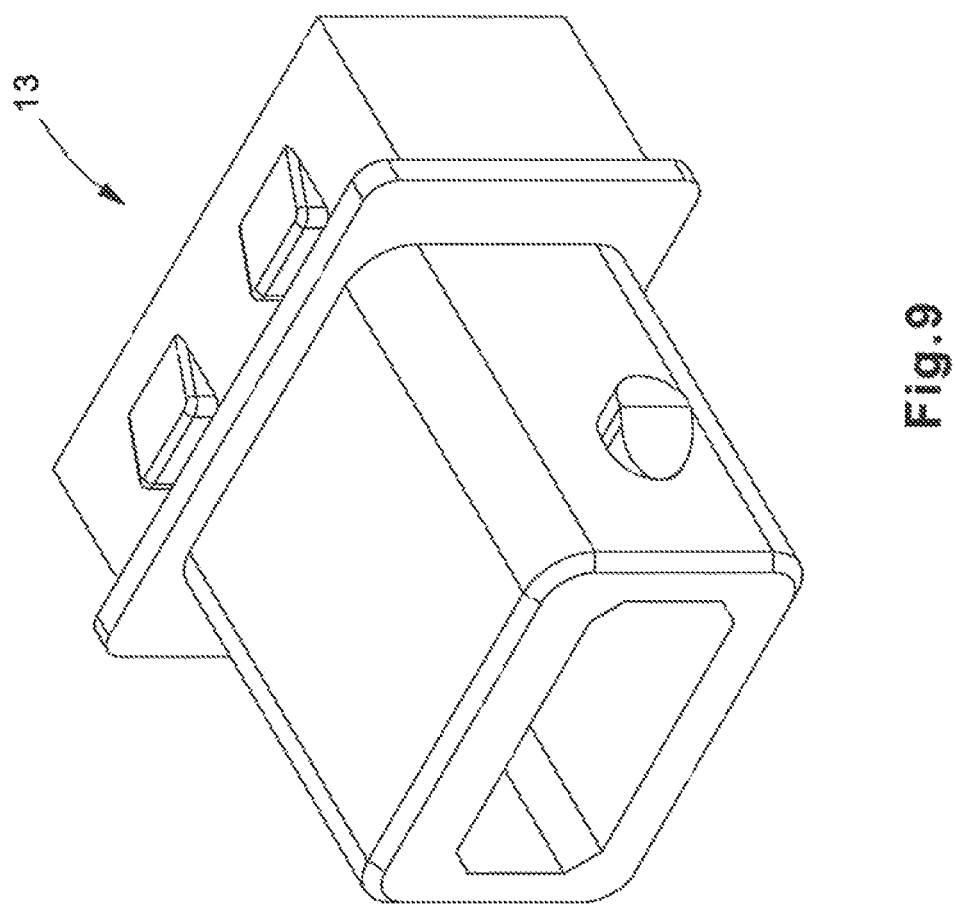
FIG. 9 is a front isometric view of a rear FSSA half.
Figure 10:
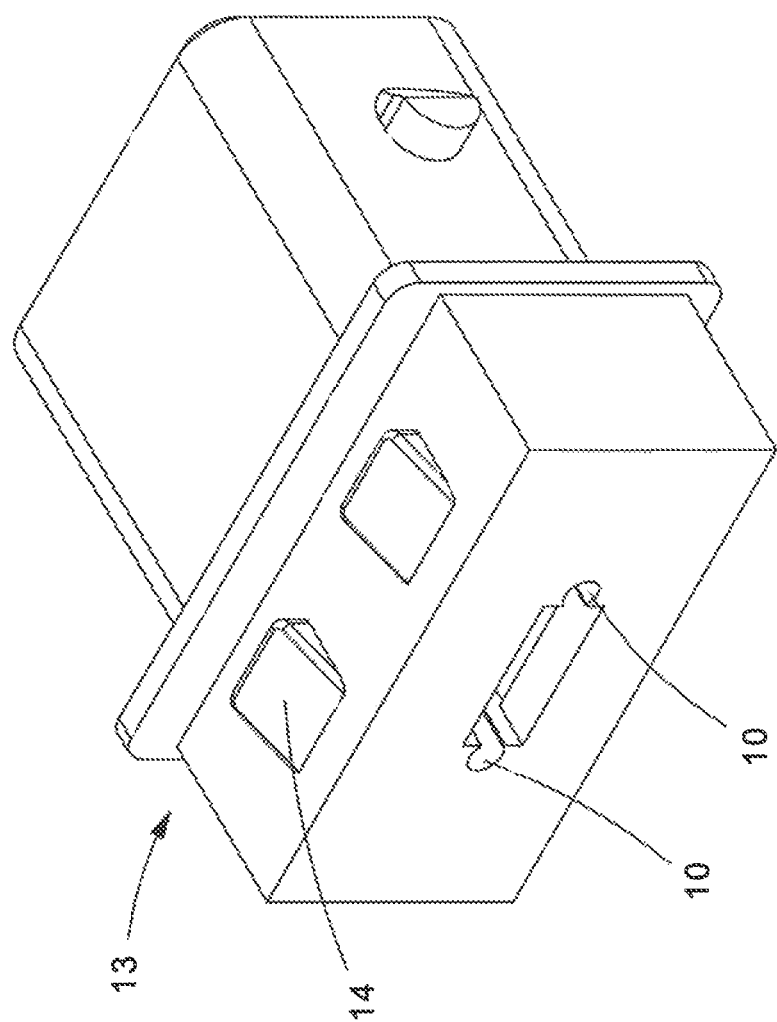
FIG. 10 is a rear isometric view of the rear FSSA half of FIG. 10.

The second part included in the FSSA is the rear adapter half 13, shown in FIGS. 9 and 10. Male latch features 14 allow the rear half and front half of the FSSA to be secured together. Similar to the front half, the rear half of the FSSA includes the cylindrical holes 10 and plastic lips 11 to prohibit movement of the split sleeves when assembled.

Figure 11:
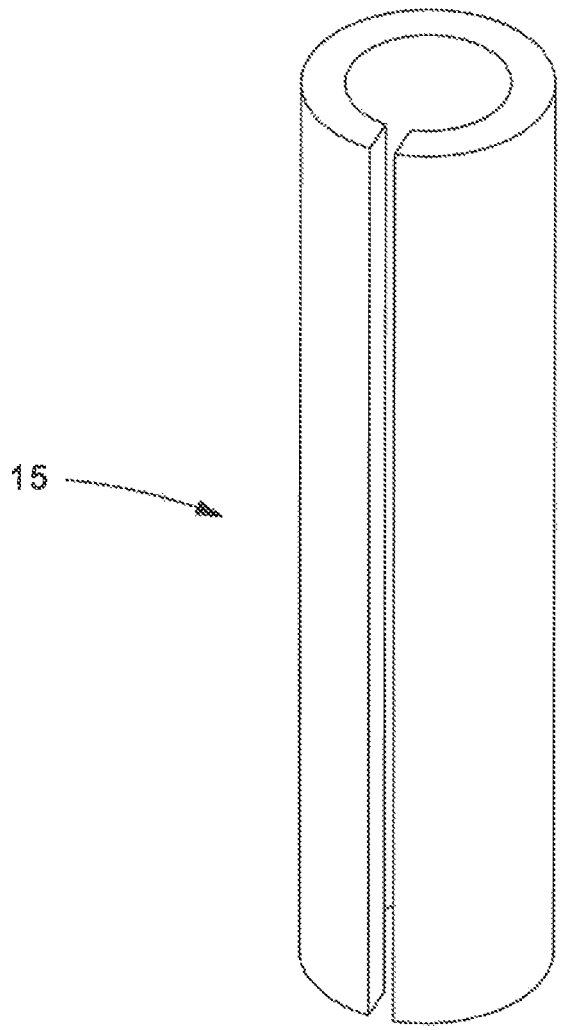
FIG. 11 is an isometric view of a split sleeve to be used in the FSSA.
Figure 13A:
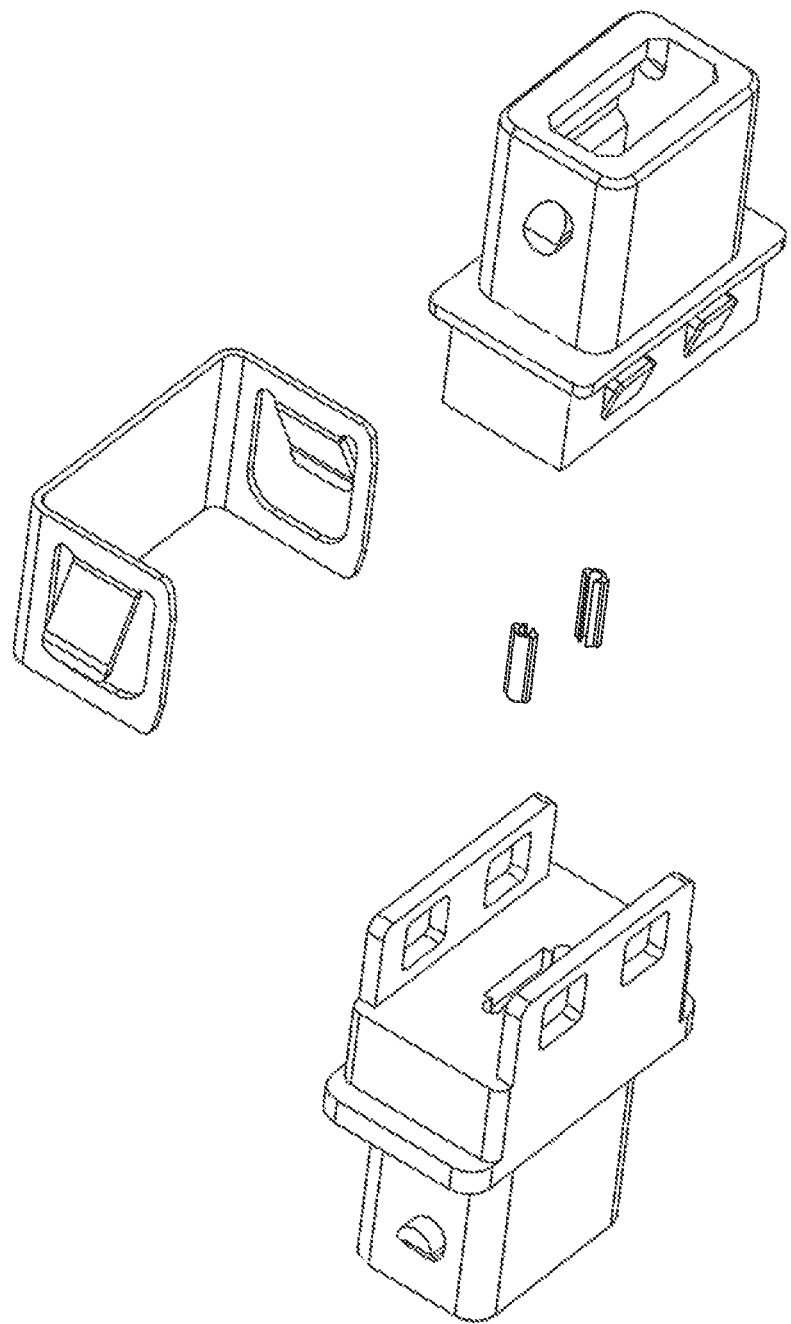
FIG. 13a is an isometric view showing the assembly of an FSSA and specifically showing a completely disassembled state.
Figure 13B:
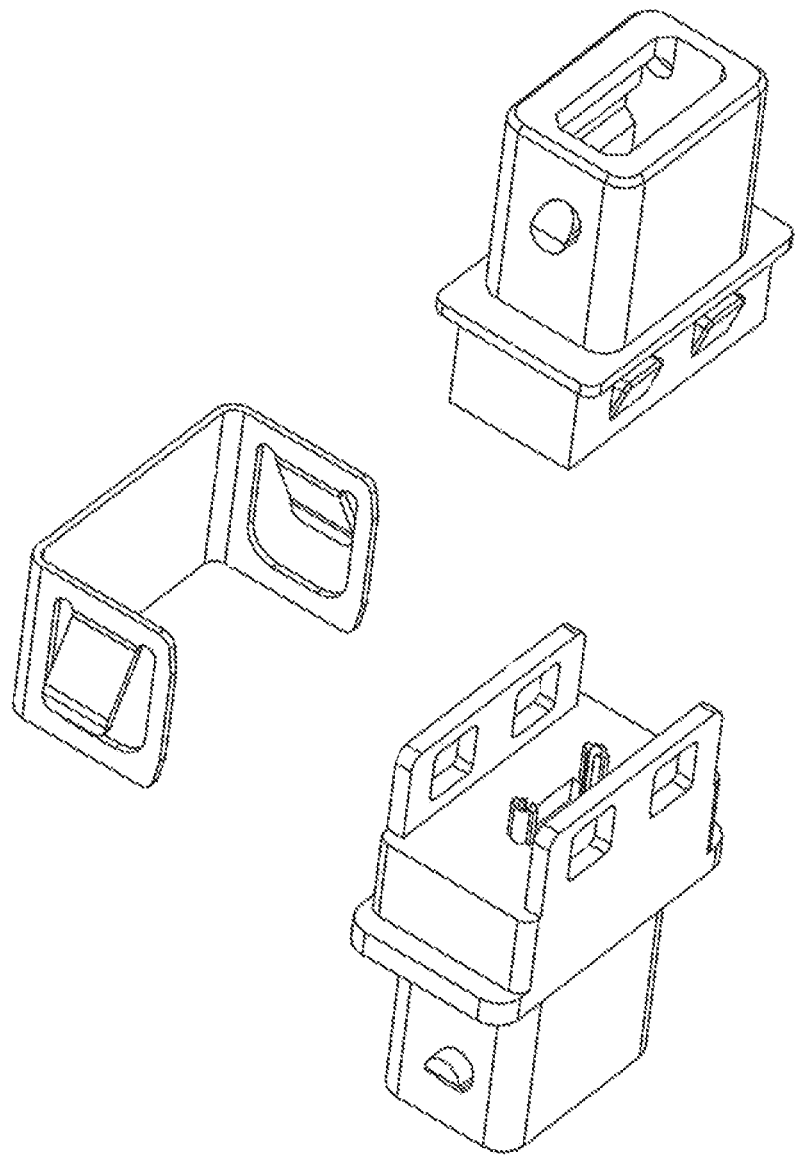
FIG. 13b is an isometric view showing the assembly of an FSSA and specifically showing the split sleeves being placed in the front half of the FSSA.
Figure 13C:
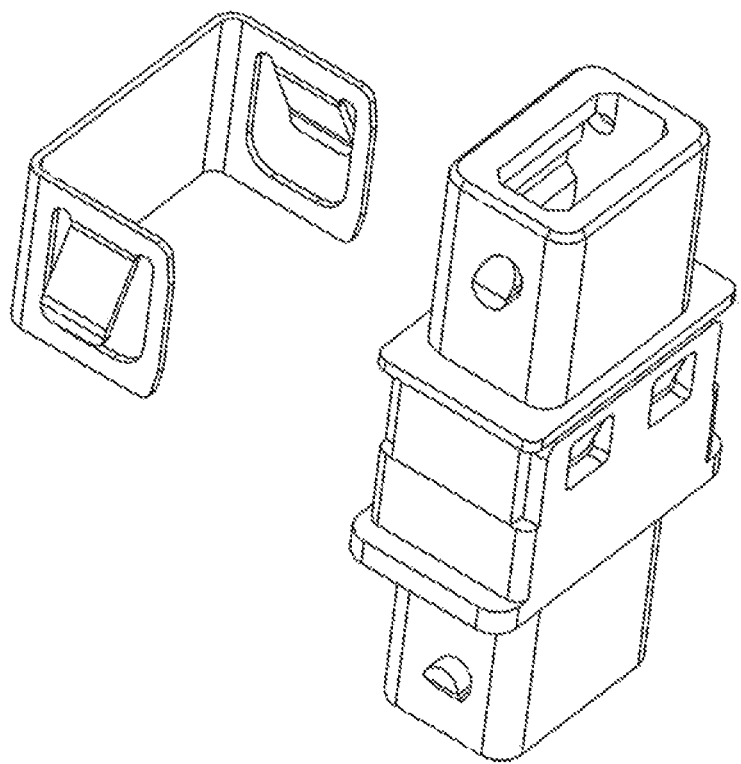
FIG. 13c is an isometric view showing the assembly of an FSSA and specifically showing the front half of the FSSA being secured to the rear half of the FSSA.
Figure 13D:
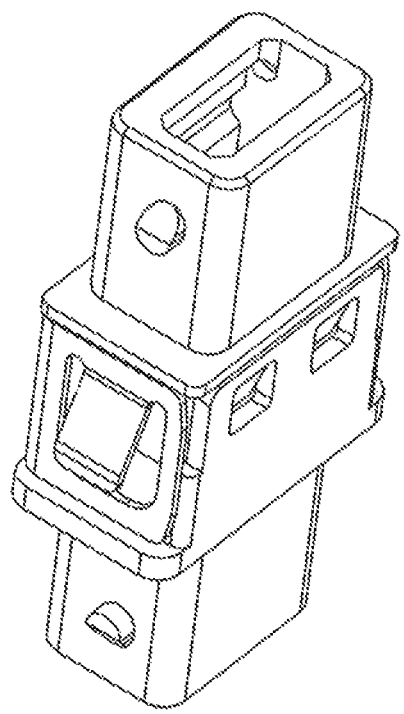
FIG. 13d is an isometric view showing the assembly of an FSSA and specifically showing a fully assembled FSSA.

The third part included in the FSSA is the split sleeve 15 shown in FIG. 11. The split sleeve will be similar to the ceramic split sleeve seen in LC and SC adapters, but could be made from another material or incorporated into an adapter half. Two split sleeves can be placed in each adapter.

The final part, the metal clip 16 included in the FSSA is seen both in the Male NGDC adapter and the preferred Female Split Sleeve Adapter. The metal clip is placed around the adapter to allow the adapter to be snapped into patch panels using flexible fingers 17.

To assemble the FSSA, as shown in FIGS. 13a-d, split sleeves 15 must be placed into the front half of the FSSA 9. The plastic lips will stop the split sleeves from falling out of the cylindrical holes. The rear half of the FSSA 13 will be attached to the front half of the FSSA, utilizing the latching features located on both halves of the FSSA. The plastic lips located on the front and rear halves of the FSSA will prohibit movement of the split sleeves after attachment is complete. The metal clip 16 will be placed around the FSSA to complete the assembly of the FSSA.

Figure 15:
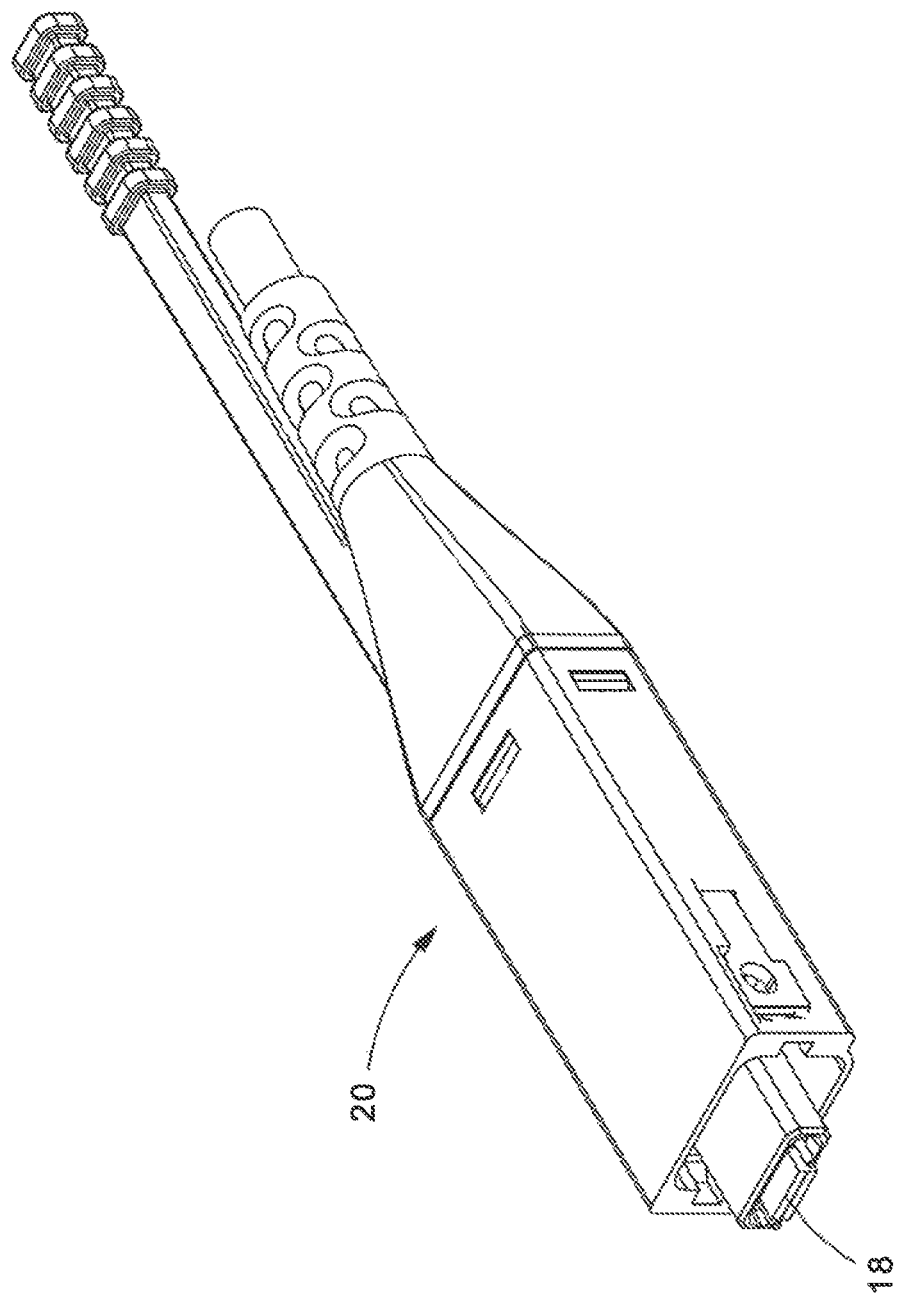
FIG. 15 is a front isometric view of a connector using the MNF of FIG. 14
Figure 16:
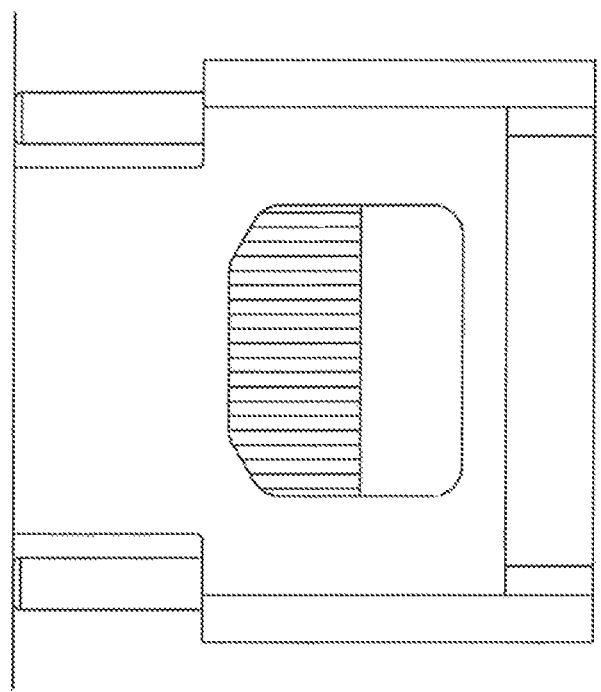
FIG. 16 shows that the alignment towers of the MNF should not be proud of the ferrule.
Figure 17:
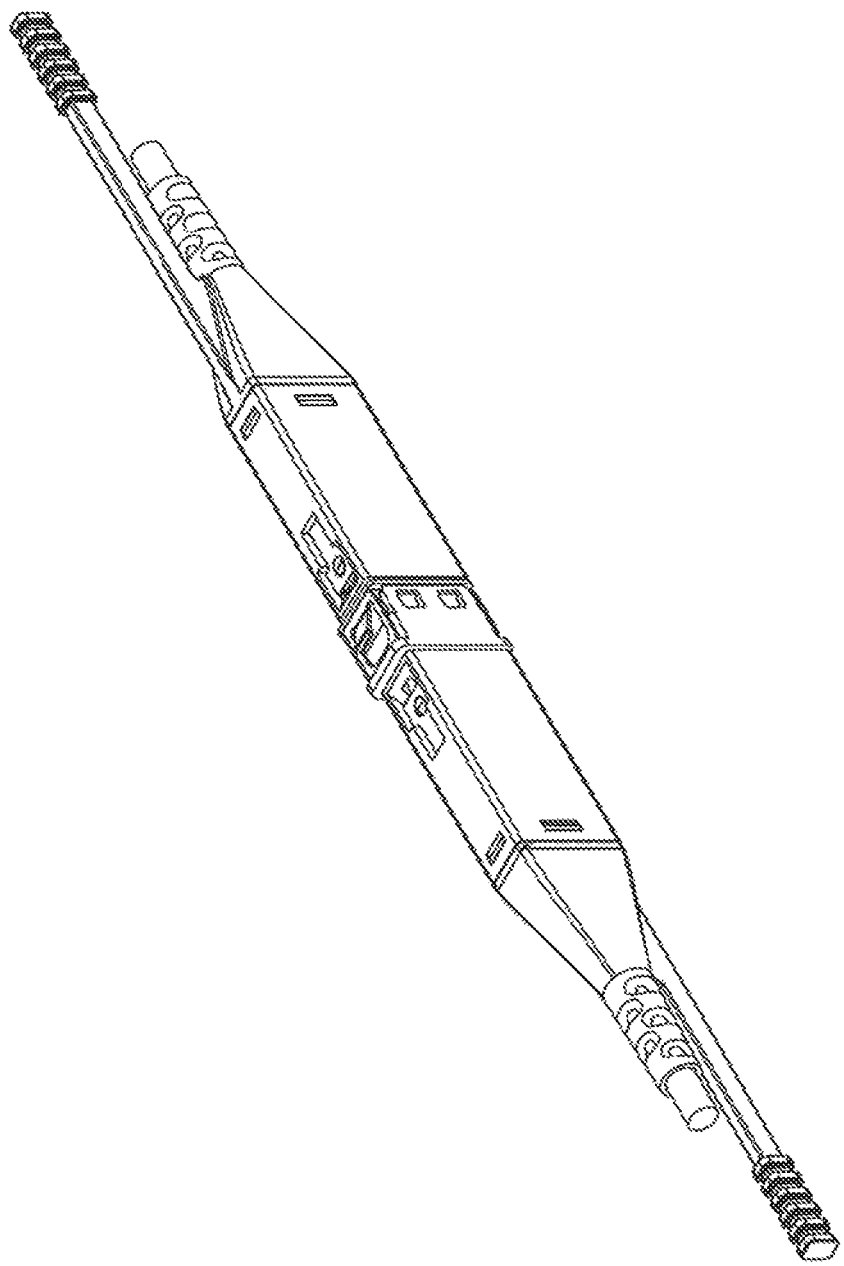
FIG. 17 is an isometric view of two connectors with MNF ferrules installed in a FSSA.
Figure 18:
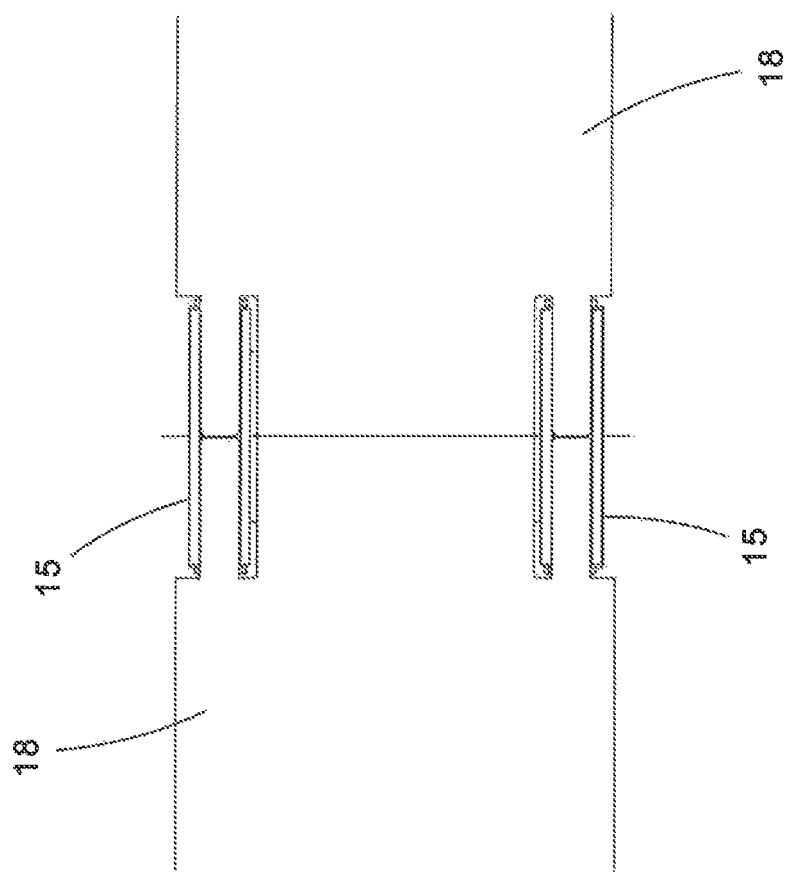
FIG. 18 shows a cross section view of 2 MNFs installed in a FSSA using split sleeves.

FIG. 14 shows an MNF 18. The MNF 18 has a base portion 34 with an endface portion 35 protruding from the base portion. Two cylindrical alignment towers 19 also protrude from the base portion 34 parallel and on either side of the endface portion 35. In order to use the FSSA, the MNF 18 (FIG. 14) must have male features to interact with the split sleeves (not shown) located in the FSSA. The male features are the two cylindrical alignment towers 19 located on each side of the MNF. The two towers can be designed as an integral part of the ferrule, or could be separate components which can be inserted into the ferrule within receiving hole or insert molded. In a preferred embodiment, the towers 19 are not proud of the endface of the ferrule. The NGDC connector 20 with the MNF ferrule (FIG. 15) can be used with the FSSA to properly align 12 fibers inside each FSSA when two connectors are mated such that the opposing fiber makes physical contact (FIGS. 17 and 18).

Figure 19:
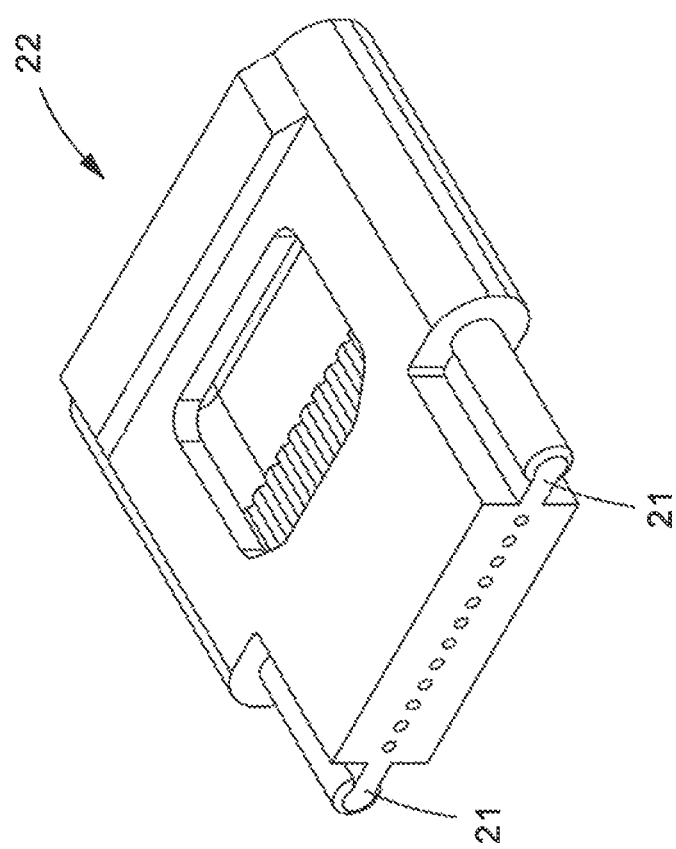
FIG. 19 is an isometric view of a first alternative MNF.
Figure 20:
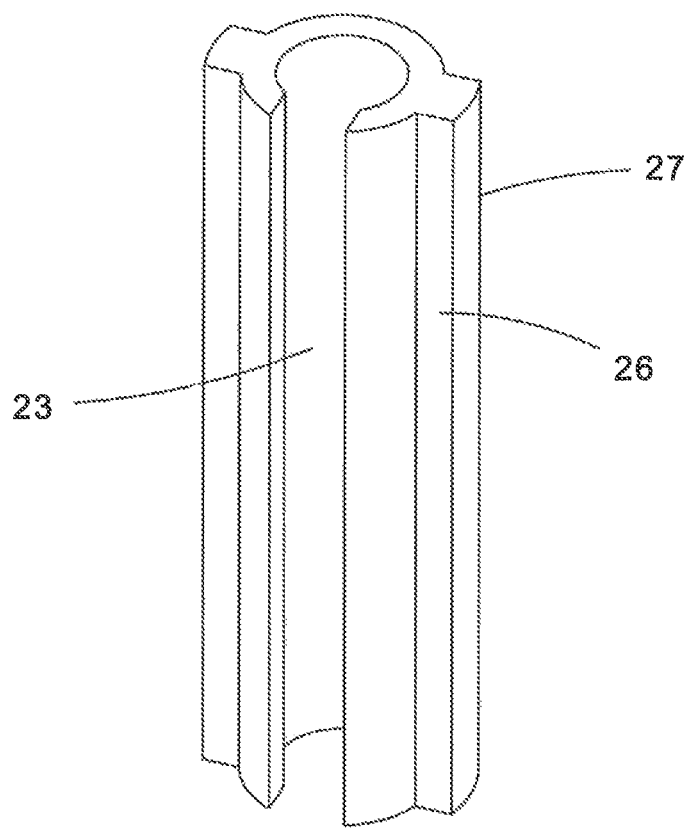
FIG. 20 is an isometric view of a keyed split sleeve to go with the alternate MNF of FIG. 19.
Figure 21:
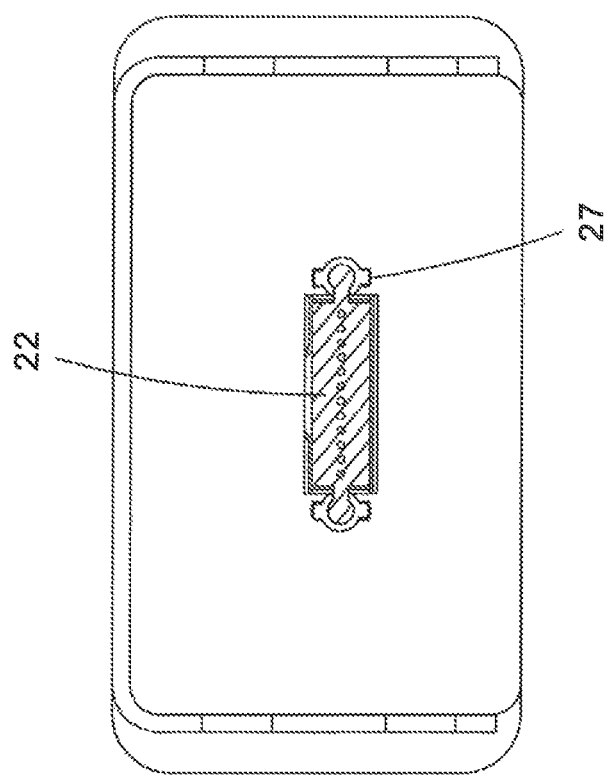
FIG. 21 is a cross-sectional view of an alternative FSSA with keying features for the keyed split sleeve of FIG. 20.

As shown in FIGS. 19-21, a first alternative embodiment shows molded webs 21 which can be added to provide additional support to the cylindrical alignment towers located on the NGDC ferrule 22. A split sleeve slot 23 fits around the web to properly hold the ferrule. Keying features 26 must be added to a possibly molded split sleeve 27 to ensure no rotation of the split sleeve within the adapter (See FIGS. 20 and 21).

Figure 22:
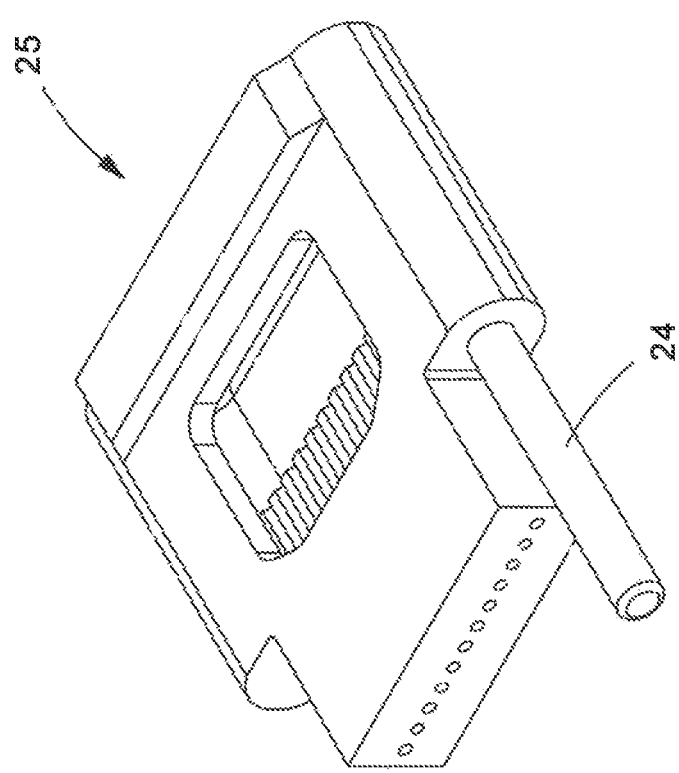
FIG. 22 is an isometric view of a second alternative MNF.
Figure 23:
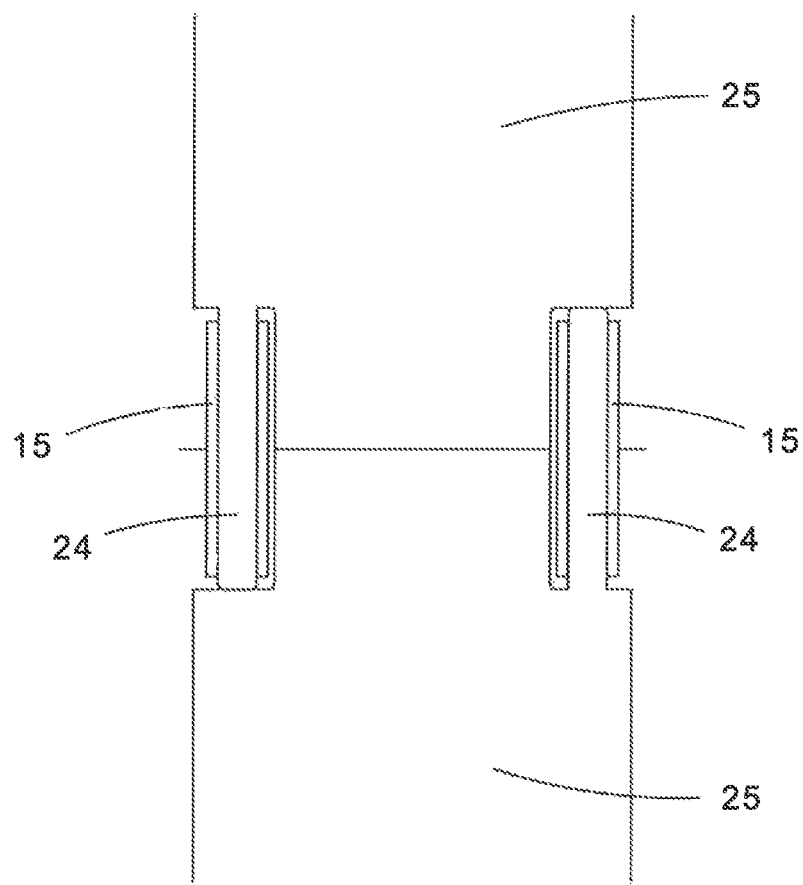
FIG. 23 is a cross-sectional view of two alternate MNFs of FIG. 22 installed in a FSSA.

As shown in FIGS. 22 and 23, a second alternative embodiment has instead of having two towers in the ferrule, one cylindrical tower 24 can be used to properly center the NGDC ferrule 25 inside of the FSSA. When mated to another ferrule, the cylindrical towers 24 will be on opposite sides of each other, allowing the ferrules to align properly within the split sleeves 15. A modified polishing machine would be needed to properly polish the ferrule as the cylindrical tower 24 stands proud of the ferrule endface.

While particular embodiments and applications of the present invention have been illustrated and described, it is to be understood that the invention is not limited to the precise construction and compositions disclosed herein and that various modifications, changes, and variations may be apparent from the foregoing without departing from the spirit and scope of the invention as described.

The invention claimed is:

1. A fiber optic connector for connecting to an adaptor, the fiber optic connector comprising:
   a housing; and
   a ferrule contained within the housing and configured to fit, at least in part, within an internal chamber formed by a housing of the adaptor, the ferrule comprising:
      a base portion;
      an endface portion protruding from the base; and
      at least one alignment tower extending from the base portion parallel to the endface portion, wherein the at least one alignment tower is configured to couple to a receiving member housed inside the internal chamber of the adaptor.

2. The fiber optic connector of claim 1, wherein the ferrule comprises two alignment towers, one on each side of the endface portion.

3. The fiber optic connector of claim 1, wherein the at least one alignment tower extends from the base portion a same length as the endface portion extends from the base portion.

4. The fiber optic connector of claim 1, wherein the alignment tower is connected to the endface portion via webbing.

5. The fiber optic connector of claim 1, wherein the at least one alignment tower extends a length from the base portion which is less than a length that the endface portion extends from the base portion.

6. The fiber optic connector of claim 1, wherein the receiving member housed inside the internal chamber of the adaptor includes a split sleeve conductor.

\* \* \* \* \*